US010292363B2

(12) United States Patent
Monk (10) Patent No.: US 10,292,363 B2
(45) Date of Patent: May 21, 2019

(54) SPECIES SPECIFIC FEEDER

(71) Applicant: Harold G Monk, Denham Springs, LA (US)

(72) Inventor: Harold G Monk, Denham Springs, LA (US)

( * ) Notice: Subject to any disclaimer, the term of this patent is extended or adjusted under 35 U.S.C. 154(b) by 515 days.

(21) Appl. No.: 14/618,609

(22) Filed: Feb. 10, 2015

(65) Prior Publication Data

US 2016/0227736 A1  Aug. 11, 2016

(51) Int. Cl.
*A01K 5/02* (2006.01)
*A01M 29/24* (2011.01)
*A01K 5/01* (2006.01)
*A01M 25/00* (2006.01)

(52) U.S. Cl.
CPC .............. *A01K 5/02* (2013.01); *A01K 5/0142* (2013.01); *A01K 5/0225* (2013.01); *A01M 25/002* (2013.01); *A01M 29/24* (2013.01)

(58) Field of Classification Search
CPC ........ A01K 1/006; A01K 5/02; A01K 5/0142; A01K 5/0233; A01K 5/0225
See application file for complete search history.

(56) References Cited

U.S. PATENT DOCUMENTS

| | | | | |
|---|---|---|---|---|
| 3,187,720 A * | 6/1965 | Stoltzfus | .............. | A01K 1/0029 119/51.12 |
| 3,465,724 A | 9/1969 | Broadbent | | |
| 3,897,753 A | 8/1975 | Lee | | |
| 4,513,687 A * | 4/1985 | De Jong | ................... | A01K 5/01 119/14.03 |
| 7,959,937 B2 | 6/2011 | Sloop | | |
| 9,084,411 B1 * | 7/2015 | McGlone | ............... | A01K 29/00 |
| 2006/0180093 A1 | 8/2006 | Cross | | |
| 2010/0132629 A1 * | 6/2010 | Jalbert | ................. | A01K 1/0107 119/720 |
| 2011/0297090 A1 | 12/2011 | Chamberlain | | |
| 2013/0192526 A1 * | 8/2013 | Mainini | ............... | A01K 15/021 119/51.02 |
| 2014/0261201 A1 | 9/2014 | Monk | | |
| 2015/0145644 A1 * | 5/2015 | Jalbert | ..................... | A01K 5/02 340/5.61 |

FOREIGN PATENT DOCUMENTS

WO  20130049226 A1  4/2013

OTHER PUBLICATIONS

Lapidge, Steven, Development of a Feral Swine Toxic Bait (Hog-Gone®) and Bait Hopper (Hog-Hopper™) in Australia and the USA, Proceedings of the 14th WDM Conference, 2012, p. 19-24.

(Continued)

*Primary Examiner* — Joshua D Huson
*Assistant Examiner* — Christopher D Hutchens
(74) *Attorney, Agent, or Firm* — John B. Edel; Edel Patents LLC (57) ABSTRACT

Animal feeders are disclosed that include housings resilient to specific species, feed compartments resilient to selected species, a protected region in the housing, a barrier between the protected region and the feed compartment, an access door, a species recognition device, an access door actuator, a controller, and an arm projecting through the housing or the barrier.

12 Claims, 5 Drawing Sheets

(56) References Cited

OTHER PUBLICATIONS

Written Opinion and Search Report from potentially relevant application PCT/US14/24851 dated Aug. 21, 2014.

Wildlife Management Services, about web-page describing older feeder version, http://www.wildlife-m-s.com/about.html, captured Sep. 19, 2014. The subject matter disclosed was obtained directly or indirectly from the inventor or was disclosed directly by the inventor.

Screen shot from The Weather Channel, Animal Invaders, Season 2 Episode 7, First Aired: Dec. 1, 2014. The subject matter disclosed was obtained directly or indirectly from the inventor.

2014 Wild Pig Conference Agenda, Apr. 13, 2014. Montgomery Alabama. The subject matter disclosed was obtained directly or indirectly from the inventor or was disclosed directly by the inventor.

2014 Wild Pig Conference PowerPoint presentation, Apr. 13, 2014. Montgomery Alabama. The subject matter was disclosed directly by the inventor.

* cited by examiner

SPECIES SPECIFIC FEEDER

Species specific feeders described herein may be used in the targeted feeding of individual species. Certain species specific feeders described herein may further be useful in the elimination of or population control of individual species in a location. Further, certain species specific feeders may be used for the feeding of an individual selected species without the feeding of a nuisance species.

DETAILED DESCRIPTION

Example 1

Figure 1:
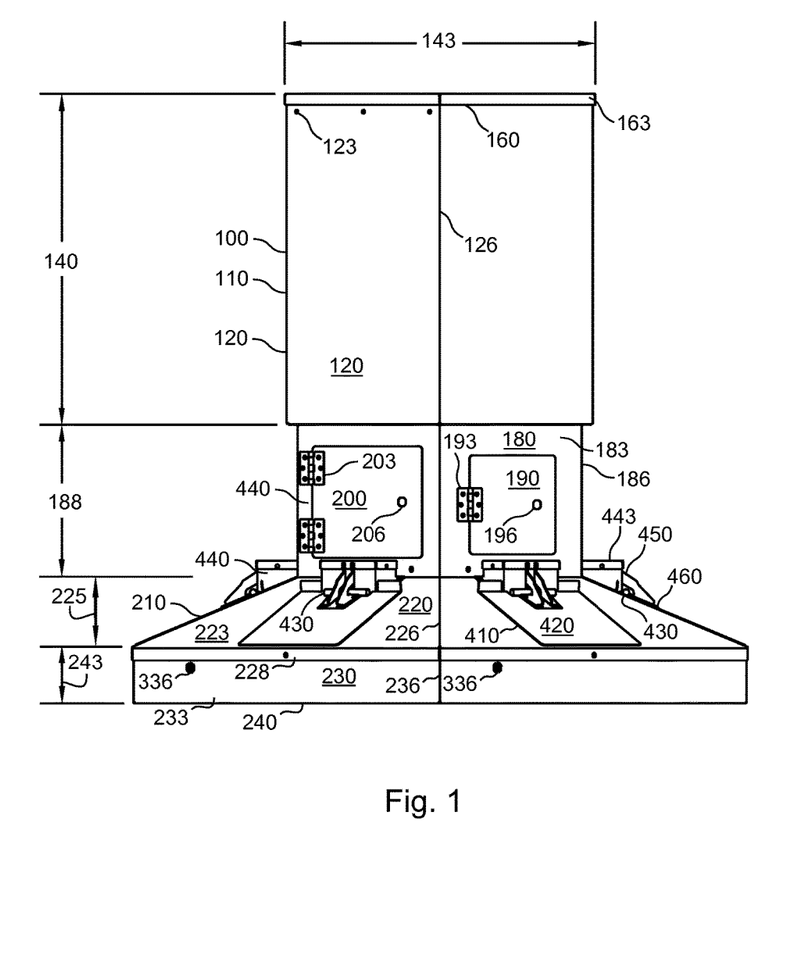
FIG. 1 shows an elevation view of a species specific feeder.

Referring now to FIG. 1 of the drawings, a Species specific feeder 100 may include elements such as a Conductive exterior 101, Feed housing 110, Feed housing side walls 120, Feed housing fasteners 123, Feed housing wall joints 126, a Feed housing height 140, a Feed housing width 143, a Feed housing top 160, Feed housing top edges 163, a Feeder midsection 180, Feeder midsection walls 183, Feeder midsection wall joints 186, a Feeder midsection height 188, a First access door 190, a First access door hinge 193, a First access door handle 196, a Second access door 200, Second access door hinges 203, a Second access door handle 206, a Feeder bottom 210, a Feeder bottom cover 220, a Feeder bottom cover upper portion 223, a Feeder bottom cover top height 225, Feeder bottom seams 226, Feeder bottom lip 228, a Feeder bottom trough 230, Feeder bottom trough side walls 233, Feeder bottom trough seams 236, a Feeder base plate 240, a Feeder bottom height 243, Microphones 336, Feed door assemblies 410, Feed doors 420, Feed door hinges 430, Feed door actuator housing 440, Feed door actuator housing lid 443, Feed door lever arms 450, and Feed door lever arm pads 460. Species specific feeder 100 may have the following sections: Feed housing 110, Feeder midsection 180, Feeder bottom cover 220, and Feeder bottom trough 230. Feed housing 110 is made up of Feed housing side walls 120, Feed housing fasteners 123, Feed housing wall joints 126, Feed housing top 160, and Feed housing top edges 163. Animal feed for the selected species is typically contained within Feed housing 110. Controls associated with Species specific feeder 100 may be found within Feeder midsection 180. The body of Feeder midsection 180 may be made up of Feeder midsection walls 183 joined at Feeder midsection wall joints 186. First access door 190 controls access to the interior of Feeder midsection 180 and First access door handle 196 and First access door hinge 193 may be used to gain access to the interior of Feeder midsection 180. Similarly, Second access door 200 controls access to the interior of Feeder midsection 180 and Second access door hinges 203 and Second access door handle 206 may be used to gain access to the interior of Feeder midsection 180. First access door handle 196 and/or Second access door handle 206 may be a low-profile handle, recessed handle, or merely a keyhole for the purposes of reducing animal's ability to damage the equipment and to reduce the potential for an animal gaining entry to the interior of Feeder midsection 180. Programmable logic controller 310 may be located behind Second access door 200 with Sound and video card 330 being located behind a similar door on the opposite side of Species specific feeder 100. Battery 370, a 12 V battery, may be found behind First access door 190 and an additional battery serving the same purpose may be found behind an equivalent access door on the opposite side of Species specific feeder 100.

Feeder bottom 210 may be made up of Feeder bottom cover 220 and Feeder bottom trough 230. Feeder bottom cover 220 may have a Feeder bottom cover upper portion 223, which has a Feeder bottom lip 228 covering a portion of Feeder bottom trough 230, and which may be joined together at Feeder bottom seams 226. Feeder bottom trough 230 may be the bottom portion of Species specific feeder 100. Feeder bottom trough 230 may have Feeder bottom trough side walls 233 joined at Feeder bottom trough seams 236 with Feeder bottom trough side walls 233 positioned on top of and connected to a Feeder base plate 240 which may form the extreme bottom portion of Species specific feeder 100. Feed housing width 143 may be 2 feet 4¼ inch wide. Feed housing height 140 may be 2 feet 6⅛ inches tall. Feeder midsection height 188 may be 1 foot 1³⁄₁₆ inches tall. Feeder bottom cover top height 225 may be 6⅜ inches tall. Feeder bottom height 243 may be 5.2 inches tall.

Species specific feeder 100 may be constructed from modular components such that Feed housing 110, Feeder midsection 180, Feeder bottom 210, and Feeder bottom trough 230 may be separated from one another for ease of transport.

Figure 2:
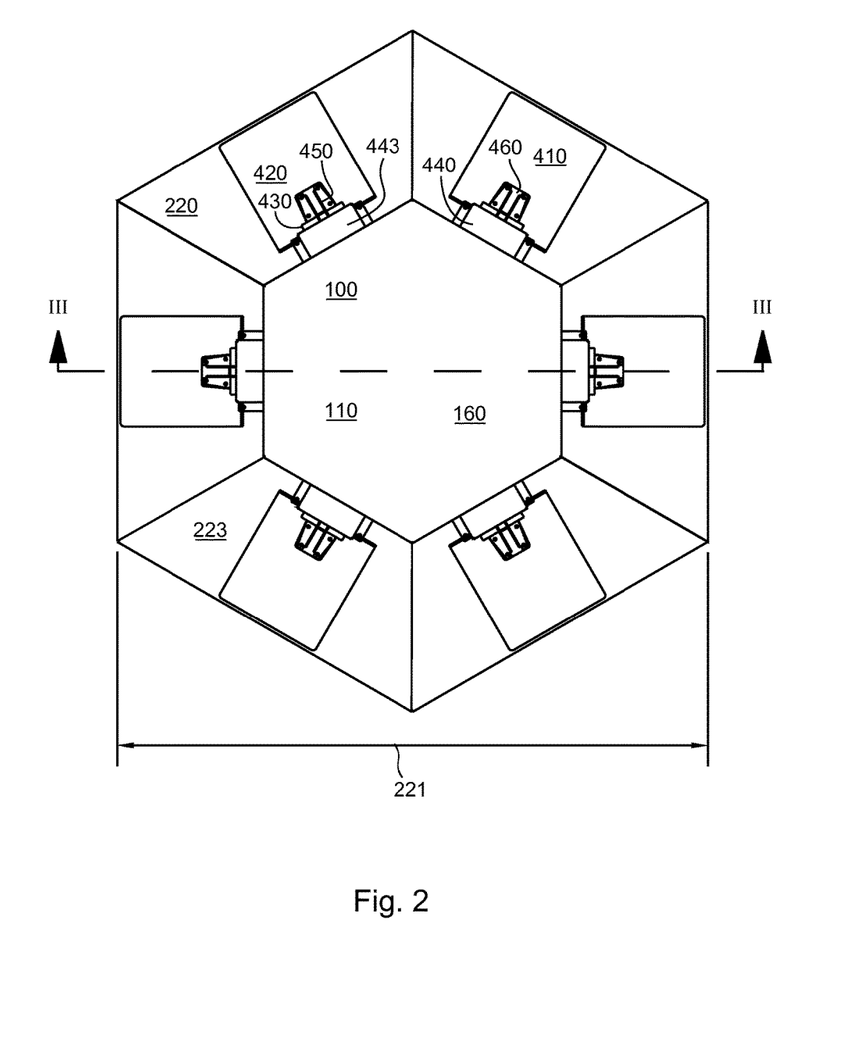
FIG. 2 shows a plan view of a species specific feeder.

Referring now to FIG. 2 of the drawings, Species specific feeder 100 is shown from a plan view with Feed housing top 160 covering the top of Feed housing 110. Feed door assemblies 410 are positioned around Feeder bottom cover 220 with the top surface of Feed doors 420 being flush with the top surface of Feeder bottom cover 220 and Feeder bottom cover upper portion 223. Feed door actuator housing 440 partially houses Feed door lever arms 450 below Feed door actuator housing lid 443. Feed door lever arms 450 protrude from Feed door actuator housing 440 and connect to Feed doors 420 by way of Feed door lever arm pads 460. Feed doors 420 are configured to pivot about Feed door hinges 430 when actuated to open or close. Feeder bottom cover width 221 may for example be 56 inches. Feed door lever arms 450 cross through a protective barrier and the aperture through which Feed door lever arms 450 protrude is limited in size so as to limit the ability of animals to tamper with Species specific feeder 100. For example, the width of the aperture through which Feed door lever arms 450 protrude may be less than four times the width of Feed door lever arms 450. In related embodiments, the aperture through which Feed door lever arms 450 protrude may have a cross-sectional area that is less than 10 times the cross-sectional area of Feed door lever arms 450. The aperture may be characterized as an armhole.

Figure 3:
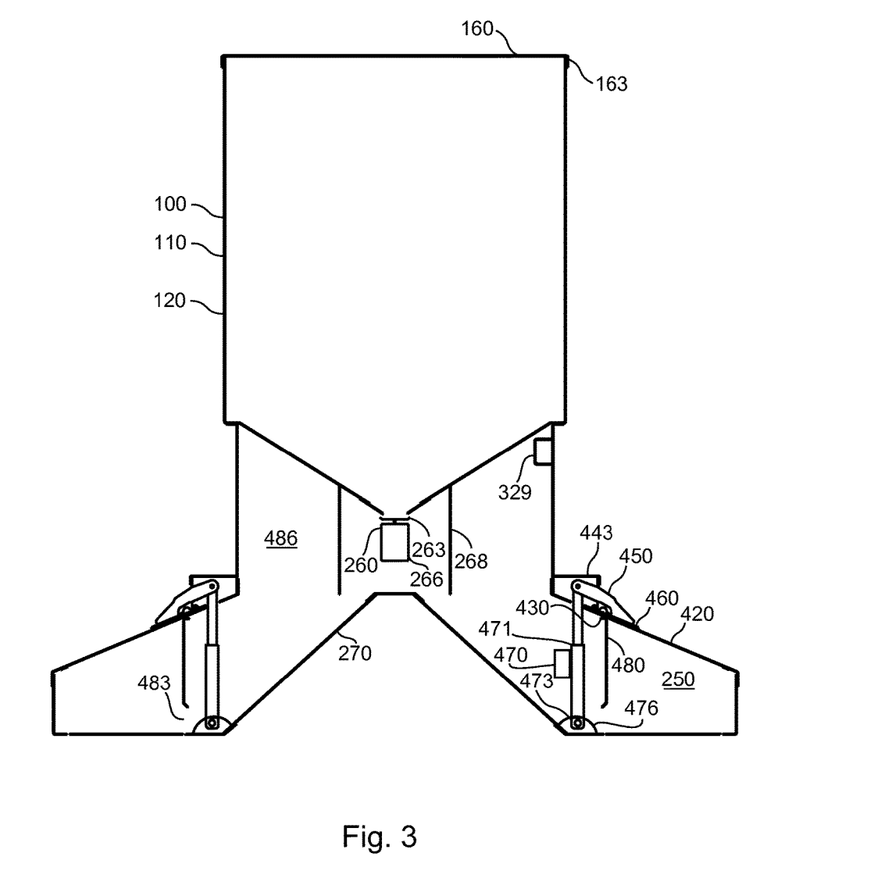
FIG. 3 shows a cross-sectional view of a species specific feeder.

Referring now to FIG. 3 of the drawings, cross section III from FIG. 2 of Species specific feeder 100 is shown depicting: Species specific feeder 100, Feed housing 110, Feed housing side walls 120, Feed housing top 160, Feed housing top edges 163, Feed compartment 250, Feed distributor 260, Feed dispenser 263, Feed distribution motor 266, Feed motor cover 268, Feed distribution cone 270, Switch housing 329, Feed doors 420, Feed door actuator housing lid 443, Feed door lever arms 450, Feed door lever arm pads 460, Feed door lever arm pads 460, Door lift motor 470, Door lift jack 471, Door lift motor attachment point 473, Door lift motor attachment structure 476, Feed compartment shield 480, Feed passage 483, and Internal compartment 486. Feed in Feed housing 110 may be feed intended to nourish, kill, or sterilize a selected species. The feed in Feed housing 110 may change from time to time for various purposes. One such purpose may be the training of a selected species to eat at Species specific feeder 100 followed by the poisoning of the selected species. In such a case, the feed in Feed housing 110 would initially be nourishing food and after the selected species was trained to eat at the Species specific feeder 100 the feed in Feed housing 110 could be changed to a poisoning or sterilizing feed. The feed in Feed housing 110 may include a population control composition. As that term is used herein "population control composition" indicates any composition that may be delivered with or as feed that when consumed by a particular animal either has significant lethal potential or impairs the ability of that animal to reproduce. For example, sodium nitrite and sodium fluoroacetate would both be considered to be population control compositions when wild boar is the selected species. Feed may be delivered from Feed housing 110 at predetermined intervals, on any schedule that may be programmed into Programmable logic controller 310 or in response to the detected presence of a selected species through Programmable logic controller 310. Feed traveling from Feed housing 110 to Feed compartment 250 passes Feed distributor 260 when Feed distribution motor 266 causes Feed dispenser 263 to spin. Feed is then directed outward from Feed dispenser 263, down along Feed motor cover 268 and brought by gravity to Feed compartment 250 along Feed distribution cone 270. Door lift motor 470 drives Door lift jack 471 by a worm gear connection. Door lift motor 470 drives Door lift jack 471 allowing Feed door assemblies 410 to engage in controlled movement while having a high resistance to movement of Feed door assemblies 410 by animals. Switch housing 329 may be located in Feed housing 110 on one of the panels not occupied by First access door 190 or Second access door 200 and Switch housing 329 may be protected from tampering in a manner comparable to the protections associated with First access door 190.

Feed compartment shield 480 serves as a species specific barrier and may be configured to be strong enough to resist damage from the selected species, but need not be configured to resist damage from species other than the selected species due to the features of the invention designed to prevent access to Feed compartment 250 by species other than the selected species. Feed passage 483 is configured to prevent substantial penetration of the selected species beyond Feed compartment shield 480. Feed compartment shield 480 is strong enough to prevent any penetration beyond Feed compartment shield 480 or any damage to Feed compartment shield 480. In the present embodiment, Feed passage 483 is narrow enough that the selected species would be unable to access Internal compartment 486 in any manner significant enough to damage any of the equipment housed in Internal compartment 486. In particular, Feed compartment shield 480 prevents any access to communication lines that may be in Internal compartment 486.

Figure 4:
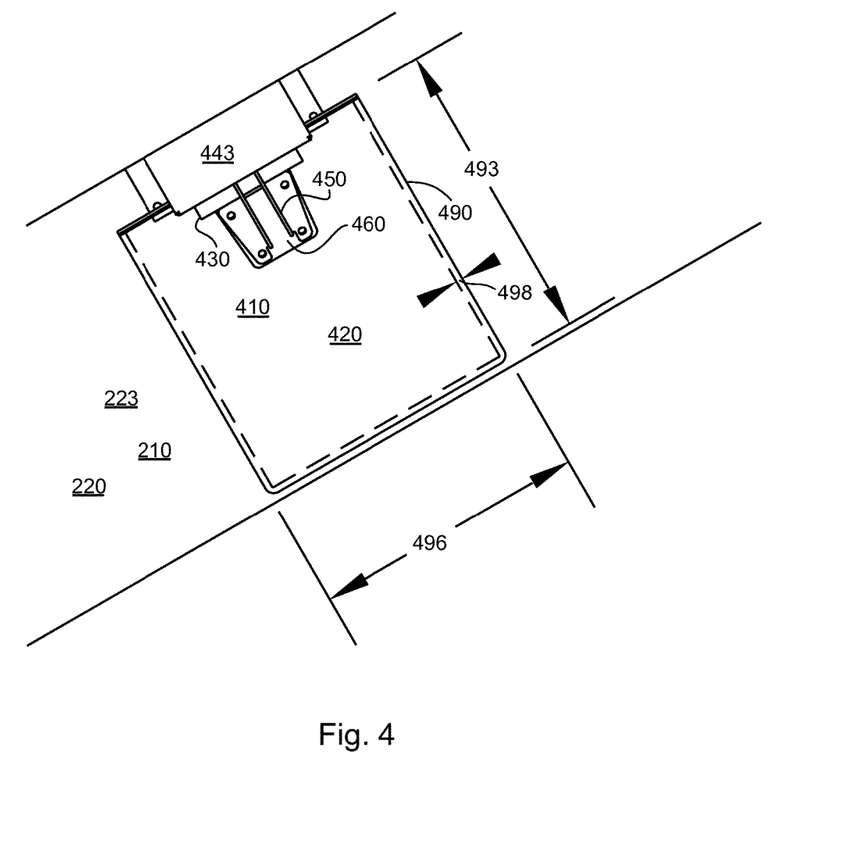
FIG. 4 shows a close up of a feeder door assembly.

Referring now to FIG. 4 of the drawings, which is a close up of Feed door assembly 410, the following elements are depicted: Feeder bottom 210, Feeder bottom cover 220, Feeder bottom cover upper portion 223, Feed doors 420, Feed door hinges 430, Feed door actuator housing lid 443, Feed door lever arms 450, Feed door lever arm pads 460, Feed door opening 490, Feed door opening depth 493, Feed door opening width 496, and Feed door opening tolerance 498. Feed door opening depth 493 may be 10½ inches. Feed door opening width 496 may be 11$^{11}$/₁₆ inches. Feed door opening tolerance 498 may be less than ¹/₁₆$^{th}$ of an inch. Further, Feed door opening tolerance 498 may be less than ⅛$^{th}$ of an inch. Further, Feed door opening tolerance 498 may be less than ¼$^{th}$ of an inch.

Figure 5:
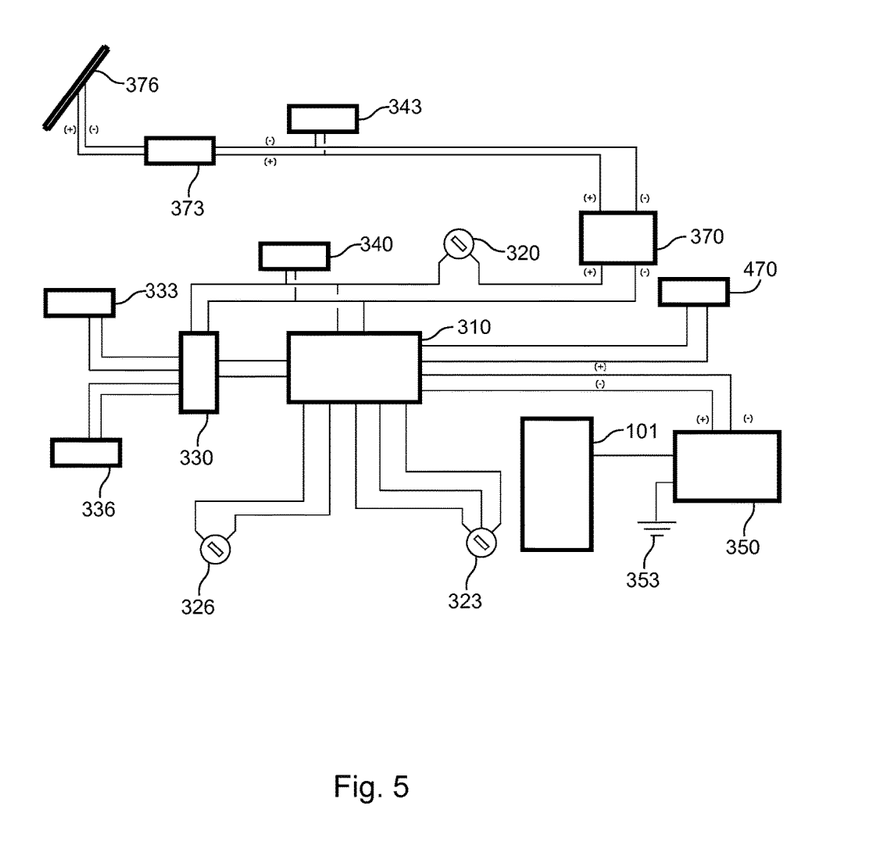
FIG. 5 is a wiring diagram for the species specific feeder.

Referring now to FIG. 5 of the drawings, which is a wiring diagram for the species specific feeder, the following elements are depicted: Conductive exterior 101, Programmable logic controller 310, System power switch 320, Door three-way switch 323, Electrical deterrent switch 326, Sound and video card 330, Video capture device 333, Microphones 336, First voltmeter 340, Second voltmeter 343, Electric deterrent 350, Ground rod 353, Door lift motor 470, Battery 370, Solar panel regulator 373, and Solar panel 376. Door three-way switch 323 may be wired to control the actuation of Feed doors 420 allowing actuation in either direction or automatic actuation. Door lift motor 470 may be a gear motor. System power switch 320 may be used to control the power supply to Species specific feeder 100. Electrical deterrent switch 326 may be used to disable the Electric deterrent 350. First voltmeter 340 and Second voltmeter 343 may be used to assess the condition of Species specific feeder 100. Solar panel 376 and Solar panel regulator 373 may be used to power Species specific feeder 100 when more conventional and readily available power sources are not nearby. Battery 370 may be used to power the system when external power is not available. Door lift motor 470 is wired to Programmable logic controller 310 which controls the operation of Door lift motor 470.

Electric deterrent 350 energizes Species specific feeder 100 at times when electrical pulses are used as a feeding deterrent. Electric deterrent 350 is an electrical pulse generating device comparable to device is used in certain animal enclosures and is capable of delivering a brief, nonlethal, and deterrent shock to animals coming into contact with the electrical conductor energized by Electric deterrent 350. Electric deterrent 350 may for example be the 5 Mile Battery Operated Solid State Charger sold as model number EDC5M-Z by Woodstream Corporation. In the present embodiment, Electric deterrent 350 is configured to energize substantially all of the perimeter of Species specific feeder 100 such that the exterior walls of Species specific feeder 100 are energized and such that animals attempting to feed from or touch Species specific feeder 100 while Electric deterrent 350 is energized would experience a deterrent shock. Species specific feeder 100 may have microphones associated with Sound and video card 330 that pickup sounds from the area outside of but near Feeder 10. Audio from the microphones may be transmitted to Sound and video card 330 where that sound is interpreted to determine if the audio captured by the microphones is that of the selected species. The microphones may be positioned along the exterior of Species specific feeder 100 and may either be recessed or otherwise positioned to be protected from local wildlife and the elements. In embodiments in which microphones are used without the assistance of video detection, Sound and video card 330 would just be a sound card having the capability to identify species specific sounds. Optionally, video detectors, such as digital cameras, may be used to capture video of the surroundings of Species specific feeder 100. Video detectors may also be recessed or otherwise positioned to be protected from local wildlife and the elements. Video detectors, when used in conjunction with Programmable logic controller 310, are capable of identifying specific species and transmitting a signal upon the recognition of that specific species. Whether by audio or video, when Sound and video card 330 recognizes the presence of the relevant species near Species specific feeder 100, Sound and video card 330 sends a signal to Programmable logic controller 310. Programmable logic controller 310 in turn shuts off Electric deterrent 350 so that the selected species may feed at Species specific feeder 100 and Sound and video card 330 sends a signal to Door lift motor 470 for Feed doors 420 to be opened. The manner of actuation needed for Feed doors 420 to open will vary by the type of actuator used. When there is a recent indication of the presence of the selected species from Sound and video card 330 Programmable logic controller 310 will not allow Electric deterrent 350 to deliver and electric shock. The amount of time Electric deterrent 350 is disabled may vary by the selected species and other factors and that amount of time may be set by programming or a separate input to Programmable logic controller 310. For example, Programmable logic controller 310 may be programmed such that Electric deterrent 350 is disabled for five minutes following the most recent identification of the selected species. Electric deterrent 350 may be wired such that whenever power is supplied to Electric deterrent 350 and indicator light is illuminated. Electric deterrent 350 is arranged and configured to be wired to a Ground rod 353 with the other pulse terminal wired to the electrically conductive exterior of Species specific feeder 100.

In various alternate embodiments Sound and video card 330 may be replaced with a sound card that does not process video or may be replaced with a video card that does not process sound.

The addition of feed to Feed compartment 250 may be according to any schedule set by the operator of Species specific feeder 100, may be gravity fed without control, or may be in response to the identified presence of the selected species.

Species not set to be recognized by Programmable logic controller 310 are deterred from feeding at Species specific feeder 100 in multiple ways. First, as Species specific feeder 100 is continually energized by Electric deterrent 350, when an unrecognized species such as a deer or bear touch Species specific feeder 100 an electrical shock is delivered. The unrecognized species quickly learn not to search for food at Species specific feeder 100 regardless of whether they can sense feed in Species specific feeder 100. Further, because Feed doors 420 are both resilient and highly resistant to movement absent the appropriate signal from Programmable logic controller 310 even powerful animals such as bears would be unable to access the feed. Both the shock deterrent and the sturdy doors are sufficient by themselves to deter animals other than wild boar from feeding at Species specific feeder 100. The redundant protection against feeding non-selected species strengthens the device's ability to feed only a particular species.

Example 2

Species specific feeder 100 may be used to control, decrease, or eliminate the presence of a species such as wild boar in a particular area. Species specific feeder 100 may be assembled substantially in the configuration depicted in FIG. 1 of the drawings in such an area with feed in Feed housing 110. It may be desirable to preserve the population of other animals while controlling the population of wild boar. Because wild boar are relatively noisy animals, particularly when feeding, Sound and video card 330 may be merely a sound card or may be set to respond to sound alone and Programmable logic controller 310 may be set up to respond to a signal that Sound and video card 330 has detected wild boar. The Electric deterrent 350 would then be armed with Feed doors 420 closed. In the event that non-selected species approached the feeder, Sound and video card 330 would not recognize the non-selected species as a wild boar and therefore Sound and video card 330 would not provide any indication to Programmable logic controller 310. Thus, if the non-selected species contacts the electrically conductive exterior of Species specific feeder 100 the non-selected species would receive a deterrent shock. When a wild boar approaches Species specific feeder 100 making noises particular to that species, Sound and video card 330 would recognize the species through associated microphones and after a communication of the species recognition to Programmable logic controller 310, Programmable logic controller 310 would generate the signals necessary to open Feed doors 420 and to disable Electric deterrent 350. Species specific feeder 100 would remain with Feed doors 420 open and Electric deterrent 350 disabled until a predetermined period of time passes in which Sound and video card 330 does not detect the presence of any wild boar. At that time, Programmable logic controller 310 would cause Feed doors 420 to close and cause Electric deterrent 350 to be enabled. Feed compartment 250 may be configured to have a particular resistance to the selected species. For example, in the case that wild boar is the selected species, components such as the Feed compartment shield 480 may be constructed of a heavy gauge metal such as 16 gauge steel and may be positioned relative to Door lift motor 470 such that the snout or tusk of a wild boar would be unable to access or damage Door lift motor 470 or any associated components.

The voltage setting of Electric deterrent 350 may be set such that it does not serve as a significant deterrent to a selected species, but does serve as a significant deterrent to a tampering species. For example, setting Electric deterrent 350 to a DC voltage of 15,000 may serve as a significant deterrent to bear without being a significant deterrent to the feeding of a wild boar. Accordingly the DC voltage may be set between 14,000 and 16,000.

Upon initial placement of Species specific feeder 100, the wild boar may be allowed to feed on feed that does not contain any population control composition so that the population of wild boar become accustomed to feeding at Species specific feeder 100. During the period in which the wild boar are becoming accustomed to Species specific feeder 100, Species specific feeder 100 may either be accessible as described above or may provide access to the feed without one or more of the species specific protections described above. For example, Electric deterrent 350 may be turned off during the period in which the wild boar are being acclimated to Species specific feeder 100. For example, Electric deterrent 350 may be disabled during the period in which the wild boar are being acclimated to Species specific feeder 100. After the wild boar population is accustomed to feeding at Species specific feeder 100, a population control composition may be added to the feeder in quantities suitable for the desired effect on the wild boar population. For example, a poison may be added to the feed to kill all of the wild boar that feed at Species specific feeder 100. In another example, a feed that inhibits the fertility of the wild boar may be administered such that the population of wild boar is controlled to a desirable level. The use of Species specific feeder 100 may be on a continual basis or may be used on a short-term basis to eliminate a local population of wild boar.

Example 3

Species specific feeder 100 may be used to feed a desirable species such as deer or elk to the exclusion of other species such as squirrels and wild boar. Species specific feeder 100 may be assembled substantially in the configuration depicted in FIG. 1 of the drawings with feed in Feed housing 110. Because deer are relatively quiet animals Sound and video card 330 may be merely a video card or may be set to respond only to video and Programmable logic controller 310 may be set up to respond to a signal that Sound and video card 330 has detected the image of a deer. The Electric deterrent 350 would then be armed with Feed doors 420 closed. In the event that non-selected species, such as wild boar, approached the feeder, Sound and video card 330 would not recognize the non-selected species as a deer and therefore Sound and video card 330 would not provide any indication to Programmable logic controller 310. Thus, if the non-selected species contacts the electrically conductive exterior of Species specific feeder 100 the non-selected species would receive a deterrent shock. When a deer approaches Species specific feeder 100 a video camera would capture images of the deer such that Sound and video card 330 would recognize the deer. After a communication of the species recognition to Programmable logic controller 310, Programmable logic controller 310 would generate the signals necessary to open Feed doors 420 and to disable Electric deterrent 350. Species specific feeder 100 would remain with Feed doors 420 open and Electric deterrent 350 disabled until a predetermined period of time passes in which Sound and video card 330 does not detect the presence of any deer. At that time, Programmable logic controller 310 would cause Feed doors 420 to close and cause Electric deterrent 350 to be enabled again. Feed compartment 250 may be configured to have a particular resistance to the selected species. For example, in the case that deer is the selected species, components such as the Feed compartment shield 480 may be constructed of metal thick enough to avoid any significant damage by a deer and may be positioned relative to Door lift motor 470 such that a deer would be unable to access or damage Door lift motor 470. In the case of deer and many other species that could be a selected species, wiring, hydraulics, and any other signal type line may be positioned behind a species specific barrier such that the selected species is unable to access or damage that equipment. For example, Feed compartment shield 480 and Feed passage 483 cooperate to make such a barrier.

Additional Embodiments

In another embodiment, Species specific feeder 100 may be constructed from a commercially available twelve door hog feeder or some other type of commercially available feeder. Components of Species specific feeder 100 may be constructed of durable materials commonly used in feeding application such as galvanized steel or powder coated steel.

Animal feeders described herein may, for example, comprise a housing wherein the housing is resilient to a selected species; a feed compartment within the housing wherein the feed compartment is resilient to the selected species; a protected region within the housing; a barrier between the protected region and the feed compartment; an access door located in the housing; a species recognition device; an access door actuator located in the protected region; and an electric shock deterrent; wherein an external portion of the housing is electrically conductive; wherein the protected region is not accessible to the selected species; and wherein the selected species is a mammalian species. In a related example, the selected species may be selected from pig, wild boar, deer, ibex, antelope, bison, caribou, cougar, elk, moose, sheep, armadillo, badger, beaver, bobcat, skunk, coyote, fox, opossum, rabbit, raccoon, zebra, rat, pigeon, parrot, silver fox, and kangaroo. In a related example, the electric shock deterrent may be configured to deactivate in response to a recognition of the mammalian species by the species recognition device. In a related example, the access door may be configured to open in response to a recognition of the mammalian species by the species recognition device. In a related example, the barrier is a selected species barrier and the selected species may be selected from pig, wild boar, deer, ibex, antelope, bison, caribou, cougar, elk, moose, sheep, armadillo, badger, beaver, bobcat, skunk, coyote, fox, opossum, rabbit, raccoon, zebra, rat, pigeon, parrot, silver fox, and kangaroo. In a related example, the selected species may be wild boar. In a related example, the housing may be resilient to a tampering species and the tampering species may be selected from pig, wild boar, deer, ibex, antelope, bison, caribou, cougar, elk, moose, sheep, armadillo, badger, beaver, bobcat, skunk, coyote, fox, opossum, rabbit, raccoon, zebra, rat, pigeon, parrot, silver fox, and kangaroo.

Animal feeders described herein may for example comprise a housing wherein the housing is resilient to a selected species; a feed compartment within the housing wherein the feed compartment is resilient to the selected species; a protected region within the housing; a barrier between the protected region and the feed compartment; an access door located in the housing; a species recognition device; an access door actuator located in the protected region; and a controller configured to operate the access door actuator in response to input from the species recognition device; wherein the access door actuator operates the access door through an obstruction selected from the housing and the barrier; wherein the barrier is a selected species barrier; wherein the access door actuator has an access door actuator communication line and the access door actuator communication line is entirely within the protected region; and wherein the selected species is selected from a mammalian species and an avian species. In a related example, the housing may be resilient to a tampering species and the tampering species may be selected from pig, wild boar, deer, ibex, antelope, bison, caribou, cougar, elk, moose, sheep, armadillo, badger, beaver, bobcat, skunk, coyote, fox, opossum, rabbit, raccoon, zebra, rat, pigeon, parrot, silver fox, and kangaroo. In a related example, the selected species may be selected from pig, wild boar, deer, ibex, antelope, bison, caribou, cougar, elk, moose, sheep, armadillo, badger, beaver, bobcat, skunk, coyote, fox, opossum, rabbit, raccoon, zebra, rat, pigeon, parrot, silver fox, and kangaroo. In a related example, the housing may be resilient to a tampering species and the tampering species may be a mammalian species having fully grown adult male animals weighing at least 50 pounds. In a related example, the animal feeder may have an electric shock deterrent. In a related example, the access door may not have a tampering species handle. In a related example, the animal feeder may also have an arm projecting through the obstruction and an armhole in the obstruction through which the arm projects; wherein the arm is connected to the access door; and wherein the arm is connected to the access door actuator. In a related example, an animal feed passage may be provided in the barrier. In a related example, a cross sectional area of the armhole may be no more than ten times a cross-sectional area of the arm. In a related example, the access door is operated by a mechanical screw. In a related example, the access door is operated hydraulically. In a related example, the access door is resistant to non-actuated motion. In a related example, no communication lines are located in the feed compartment.

As that term is used herein, a selected species is a species chosen as the intended species to consume feed from the species specific feeder. The selected species may be selected from any number of species. For example, the selected species may be chosen from: pig, wild boar, deer, ibex, antelope, bison, caribou, cougar, elk, moose, sheep, armadillo, badger, beaver, bobcat, skunk, coyote, fox, opossum, rabbit, raccoon, zebra, rat, pigeon, parrot, silver fox, and kangaroo. The selected species may be a mammalian species or the selected species may be an avian species. As that term is used herein, a tampering species is a species other than the selected species possessing an ability or inclination to either access the feed in the species specific feeder or to tamper with the species specific feeder for other reasons. The tampering species may be selected from any number of species. For example, the tampering species may be chosen from: pig, wild boar, deer, ibex, antelope, bison, caribou, cougar, elk, moose, sheep, armadillo, badger, beaver, bobcat, skunk, coyote, fox, opossum, rabbit, raccoon, zebra, rat, pigeon, parrot, silver fox, and kangaroo. The tampering species may be a mammalian species or the tampering species may be an avian species.

Embodiments described herein may be used to feed species for which there are legal protections to the exclusion of species which compete with the protected species for food. Alternatively, embodiments described herein may be used to feed species that compete with protected species for food to the exclusion of the protected species.

Various components of the species specific feeder have particular design characteristics relating to the prevention of machine damage or the control of access. As that term is used herein, a species specific barrier is a barrier which prevents a specific species from accessing points beyond the barrier. An example of a species specific barrier would be a hog barrier. Feed compartment shield 480 is an example of a hog barrier. Another example of a hog barrier may be an elongated opening having an opening height of less than 2 inches in which the opening is between two 16 gauge steel plates.

As that term is used herein, species specific resilience indicates a construction sufficiently strong to avoid critical damage by a particular species. As that term is used herein, critical damage indicates damage that would impair the operation of any part or component part. As an example, hog resilience would be a type of species specific resilience. A hog resilient door would be a door that would maintain its function in spite of tampering efforts by a fully grown adult hog. A test to determine whether a component has species specific resilience may include placing a fully grown adult of the larger or more powerful gender in a controlled environment in which food may be accessed by delivering critical damage to the component.

As that term is used herein, a species specific maximum force is the maximum pulling or pushing force a fully grown adult of the larger or more powerful gender of the particular species is capable of administering. As that term is used herein, a species specific handle is any component or portion thereof that may be acted upon by the specific species such that the species is able to pull on the component or portion thereof with greater than 20% of the species specific maximum force. Such pulling may be done by snout, claw, paw, hoof, teeth, tusk, etc. A species specific handle may take the form of a hog handle which for example may be the outer edge of a door on a commercially available twelve door hog feeder wherein that door is configured to be lifted by the snout of a hog.

As that term is used herein "arm" includes a variety of implements capable of applying force from a distance such as rods, steel plates, and iron bars. Feed door lever arms 450 as depicted in FIG. 2 of the drawings may be considered arms. Further the phrase "communication lines" as used herein indicates lines which may incite action through the transmission of electric, hydraulic, pneumatic, or other signal. Accordingly, wires is arranged to power an electric motor may be considered "communication lines" as that phrase is used herein.

The above-described embodiments have a number of independently useful individual features that have particular utility when used in combination with one another including combinations of features from embodiments described separately. There are, of course, other alternate embodiments which are obvious from the foregoing descriptions of the invention, which are intended to be included within the scope of the invention, as defined by the following claims.

I claim:

1. An animal feeder comprising:
   a. a housing wherein the housing is resilient to a selected species;
   b. a feed compartment within the housing wherein the feed compartment is resilient to the selected species;
   c. a protected region within the housing;
   d. a barrier between the protected region and the feed compartment;
   e. an access door located in the housing;
   f. a species recognition device;
   g. an access door actuator located in the protected region; and
   h. an electric shock deterrent;
   i. wherein an external portion of the housing is electrically conductive;
   j. wherein the protected region is not accessible to the selected species;
   k. wherein the housing is a hog resilient housing;
   l. wherein the access door is a hog resilient access door; and
   m. wherein the selected species is a mammalian species.

2. The animal feeder of claim 1 wherein the electric shock deterrent is configured to deactivate in response to a recognition of the mammalian species by the species recognition device.

3. The animal feeder of claim 1 wherein the access door is configured to open in response to a recognition of the mammalian species by the species recognition device.

4. The animal feeder of claim 1 wherein the selected species is wild boar.

5. An animal feeder comprising:
   a. a housing wherein the housing is resilient to a selected species;
   b. a feed compartment within the housing wherein the feed compartment is resilient to the selected species;
   c. a protected region within the housing;
   d. a barrier between the protected region and the feed compartment;
   e. an access door located in the housing;
   f. a species recognition device;
   g. an access door actuator located in the protected region; and
   h. an electric shock deterrent;
   i. wherein the access door actuator operates in response to the species recognition device;
   j. wherein the access door actuator operates the access door through an obstruction selected from the housing and the barrier;

k. wherein the barrier is a selected species barrier;
l. wherein the access door actuator has an access door actuator communication line and the access door actuator communication line is entirely within the protected region;
m. wherein the housing is a bear resilient housing;
n. wherein the access door is a bear resilient access door; and
o. wherein the selected species is selected from a mammalian species and an avian species.

6. The animal feeder of claim 5 further comprising
a. an arm projecting through the obstruction; and
b. an armhole in the obstruction through which the arm projects;
c. wherein the arm is connected to the access door; and
d. wherein the arm is connected to the access door actuator.

7. The animal feeder of claim 6 wherein a cross sectional area of the armhole is no more than ten times a cross-sectional area of the arm.

8. The animal feeder of claim 5 wherein an animal feed passage is provided in the barrier.

9. The animal feeder of claim 5 wherein the access door is operated by a mechanical screw.

10. The animal feeder of claim 5 wherein the access door is operated hydraulically.

11. The animal feeder of claim 5 wherein the access door is resistant to non-actuated motion.

12. The animal feeder of claim 5 wherein no communication lines are located in the feed compartment.

* * * * *